United States Patent
Evanovich et al.

(10) Patent No.: US 6,508,271 B2
(45) Date of Patent: Jan. 21, 2003

(54) ROTOMOLDED HYDRAULIC RESERVOIR WITH INTEGRAL EXTENDED LENGTH RETURN LINE

(75) Inventors: Steven R. Evanovich, Pittsburgh, PA (US); Alfred L. Baum, Cranberry Township, Butler County, PA (US)

(73) Assignee: Alco Industries, McKees Rocks, PA (US)

(*) Notice: Subject to any disclaimer, the term of this patent is extended or adjusted under 35 U.S.C. 154(b) by 0 days.

(21) Appl. No.: 09/844,249

(22) Filed: Apr. 27, 2001

(65) Prior Publication Data

US 2002/0003000 A1 Jan. 10, 2002

Related U.S. Application Data

(60) Provisional application No. 60/200,452, filed on Apr. 28, 2000.

(51) Int. Cl.[7] ............ F16K 24/00; E03B 11/00
(52) U.S. Cl. .............. 137/549; 137/574; 137/587; 137/592
(58) Field of Search ............... 137/587, 592, 137/574, 549

(56) References Cited

U.S. PATENT DOCUMENTS

| | | | |
|---|---|---|---|
| 1,310,517 A | 7/1919 | Xardell | |
| 1,562,074 A | 11/1925 | Baum | |
| 1,909,734 A | 5/1933 | Thwaits | |
| 1,924,741 A | 8/1933 | Hoopes et al. | 220/86 |
| 2,091,731 A | 8/1937 | Gredell | 220/22 |
| 2,379,126 A | 6/1945 | Welden | 220/63 |
| 2,538,336 A | 1/1951 | Smith | 222/455 |
| 2,675,682 A | 4/1954 | Dobson | 62/1 |
| 2,715,040 A | 9/1955 | Rhoads, Sr. | 296/24 |
| 2,806,622 A | 9/1957 | Leirer | 220/5 |
| 2,860,809 A | 11/1958 | Perry | 220/22 |
| 3,364,292 A | 1/1968 | Lemelson | 264/275 |
| 3,610,457 A | 10/1971 | Opalewski | 220/22 |
| 3,645,416 A | 2/1972 | Main, Jr. | 220/22 |
| 4,023,257 A | 5/1977 | Wright et al. | 29/460 |
| 4,143,193 A | 3/1979 | Rees | 428/35 |
| 4,350,258 A | 9/1982 | Rogers | |
| 4,431,027 A | 2/1984 | Sabina, Jr. | 137/574 |
| 4,517,231 A | 5/1985 | May et al. | 428/35 |
| 4,526,286 A | 7/1985 | Jung et al. | 220/22 |
| 4,611,724 A | 9/1986 | Watkins et al. | 220/5 A |
| 4,638,836 A | 1/1987 | Bailey | 137/574 |
| 4,664,958 A | 5/1987 | Jones | 428/36 |
| 4,789,170 A | 12/1988 | Reber | 280/5 D |
| 4,847,028 A | 7/1989 | Snyder et al. | 264/155 |
| 4,852,258 A | 8/1989 | Foster | 30/276 |
| 4,852,758 A * | 8/1989 | Kormendi et al. | 220/501 |
| 4,994,132 A | 2/1991 | Liekens et al. | 156/245 |
| 5,076,703 A | 12/1991 | Loefke et al. | 366/61 |
| 5,127,432 A | 7/1992 | Duhaime et al. | 137/574 |
| 5,186,324 A | 2/1993 | Brandon, Jr. | 206/223 |
| 5,285,923 A | 2/1994 | Brandon, Jr. | 220/601 |
| 5,344,038 A | 9/1994 | Freeman et al. | 220/453 |
| 5,503,284 A | 4/1996 | Li | 215/383 |
| 5,564,749 A | 10/1996 | Branham | 280/830 |
| 5,765,713 A | 6/1998 | Geisheker et al. | 220/562 |
| 5,850,933 A * | 12/1998 | Pazik | 220/563 |
| 5,911,938 A | 6/1999 | El et al. | 264/261 |
| 5,960,981 A | 10/1999 | Dodson et al. | 220/563 |
| 5,975,687 A | 11/1999 | Powers | 347/87 |
| 6,032,819 A | 3/2000 | Hanna | 220/501 |
| 6,116,454 A * | 9/2000 | Henderson et al. | 220/563 |
| 6,138,857 A | 10/2000 | Keller | 220/495.01 |
| 6,161,719 A | 12/2000 | Madison | 220/567 |
| 6,220,287 B1 | 4/2001 | Wolf | 137/574 |
| 6,227,221 B1 * | 5/2001 | Schmitz | 137/1 |

* cited by examiner

*Primary Examiner*—A. Michael Chambers
(74) *Attorney, Agent, or Firm*—Webb Ziesenheim Logsdon Orkin & Hanson, P.C.

(57) ABSTRACT

A rotomolded hydraulic reservoir includes a plastic container body defining a container cavity for receiving hydraulic fluid and forming a filter cavity in fluid communication with the container cavity. One or more fluid return lines extend to a depth below the normal fluid level in the container cavity, with the filter cavity forming one of the return lines.

19 Claims, 8 Drawing Sheets

ROTOMOLDED HYDRAULIC RESERVOIR WITH INTEGRAL EXTENDED LENGTH RETURN LINE

RELATED APPLICATION

This application claims the benefit of co-pending United States Provisional Application Serial No. 60/200,452 entitled "ROTOMOLDED HYDRAULIC RESERVOIR WITH INTEGRAL FILTER BOWL" filed on Apr. 28, 2000, which is incorporated herein in its entirety.

BACKGROUND OF THE INVENTION

1. Field of the Invention

The present invention relates to a hydraulic reservoir and, more particularly, to a hydraulic fluid reservoir formed by rotational molding with one or more integral extended depth return lines.

2. Brief Description of the Prior Art

Rotational molding, or rotomolding, is a well-known method of forming objects from a plastic resin. It is often used for complex shapes including tanks and reservoirs. Various types of plastic resin can be used, such as polyethylenes, plastisols, nylons, fluoropolymers, polypropylenes, polyurethanes, and other suitable materials.

In general, a mold is loaded with a plastic resin and heated in an oven. As the mold is heated, the mold is rotated about two or even three, axes at a low speed. The heat melts the plastic resin inside the mold and melted resin coats the interior surface of the mold. The mold is then gradually cooled using air or water and the resolidified plastic resin, which has assumed the shape of the interior walls of the mold, is removed from the mold. This process differs from injection molding in that the plastic resin is not pressurized (other than atmospheric pressure).

As shown in U.S. Pat. No. 5,285,923, it is occasionally necessary to insert objects made of a material other than plastic resin into the object to be formed, such as brass inserts molded into a polyethylene material. U.S. Pat. Nos. 3,364,292; 4,023,257; 4,143,193; 4,847,028; and 5,911,938 also discuss rotomolding with inserts added to the molded product. All of the above-cited references are incorporated herein by reference.

As noted in the above-cited prior art, rotomolding is well-suited for forming a plastic tank or reservoir structure. Such tanks are often used as hydraulic reservoirs for hydraulic systems, such as used in heavy machinery, including cranes, backhoes, demolition shears, bulldozers, and the like. In hydraulic systems, it is important to keep the hydraulic fluid free of debris. Consequently, filtering elements have been incorporated in the hydraulic systems to filter debris from the hydraulic fluid.

It is an object of the present invention to provide a rotomolded hydraulic reservoir with at least one extended length return line for the hydraulic reservoir. It is a further object of the present invention to provide a rotomolded hydraulic reservoir with integral filter bowl having an extended integral filter container with a coupling insert. It is another object of the present invention to provide a rotomolded hydraulic reservoir with an improved baffle and a second extended depth fluid return. It is another object of the present invention to provide a hydraulic reservoir which is economically manufactured. It is a further object of the present invention to provide an effective, easily replaceable filter element for a hydraulic reservoir.

SUMMARY OF THE INVENTION

The above objects are achieved with a rotomolded hydraulic reservoir having at least one extended length return line according to the present invention. The hydraulic reservoir is a one-piece tank structure. Specifically, the hydraulic reservoir includes a plastic container body defining a container cavity for receiving the hydraulic fluid. The container body may form a filter cavity in fluid communication with the container cavity. A filter element coupling insert, such as a machined metallic bushing, may be molded in the container body adjacent the filter cavity. The insert defines an opening, specifically an internal bore, providing the communication between the container cavity and the filter cavity. A removable filter element is positioned within the filter cavity and coupled to the insert. The removable filter element seals to the exterior of the insert.

The fluid communication provided between the filter cavity and the container cavity is provided to extend to a level below the normal fluid level in the hydraulic reservoir. Additionally, a second fluid return communicating with the container cavity may be provided in one embodiment of the present invention with the second fluid return including an integral metallic coupling insert. The second fluid return may be provided with a fluid communication with the container cavity at a level lower than the normal fluid level within the container cavity. A normal fluid level for a hydraulic reservoir varies between rest and operating conditions. Although the fluid level in a hydraulic reservoir is dynamic, the term normal fluid level is a specific defined range unique to a given hydraulic reservoir and a given application. The provision of the return lines to a level below the normal fluid level will prevent foaming in the fluid within the container cavity.

These and other advantages of the present invention will be clarified in the description of the preferred embodiments taken together with the attached drawings in which like reference numerals represent like elements throughout.

DETAILED DESCRIPTION OF THE PREFERRED EMBODIMENTS

Figure 1:
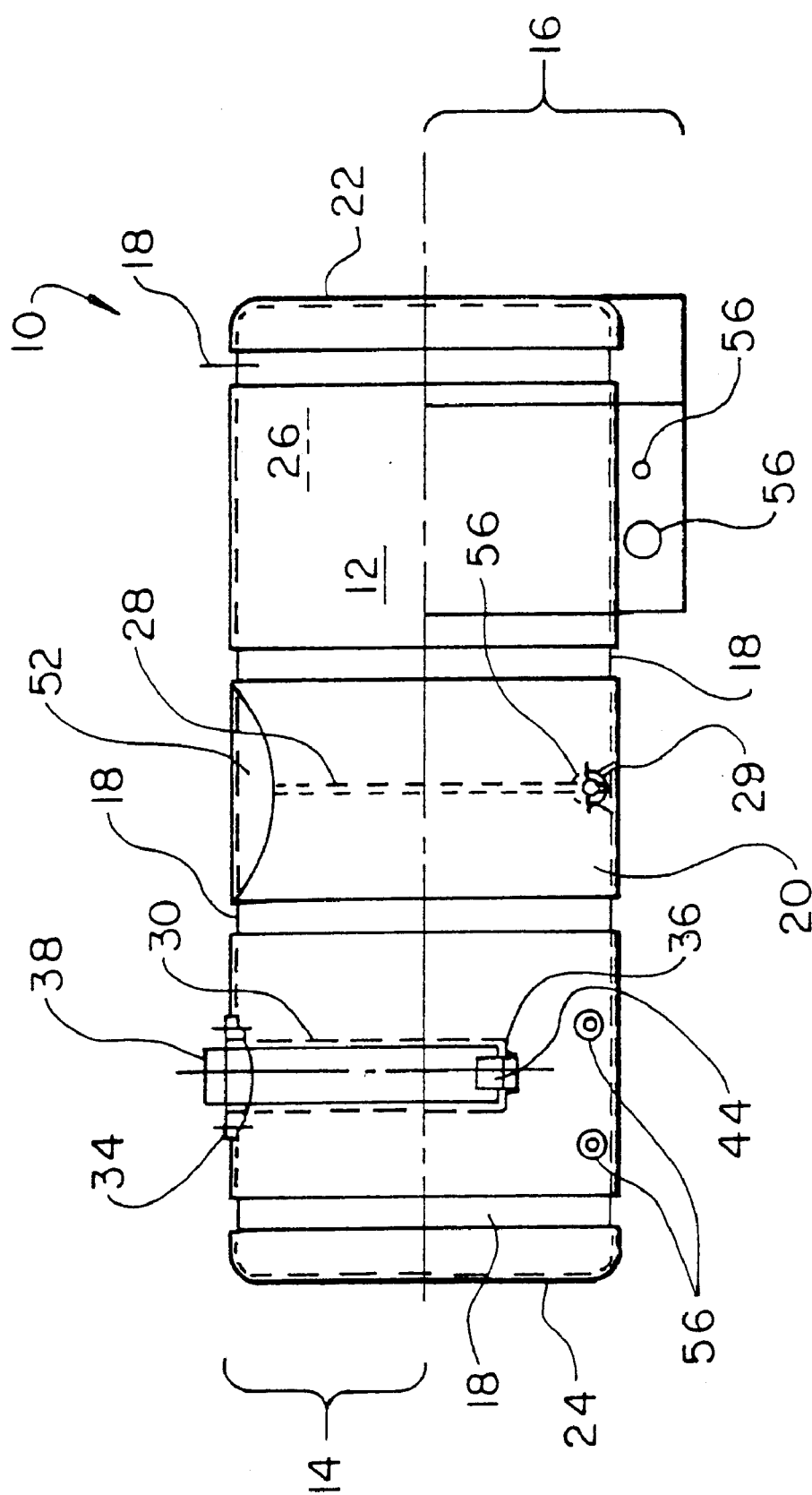
FIG. 1 is a front side view of a rotomolded hydraulic reservoir according to the present invention.
Figure 2:
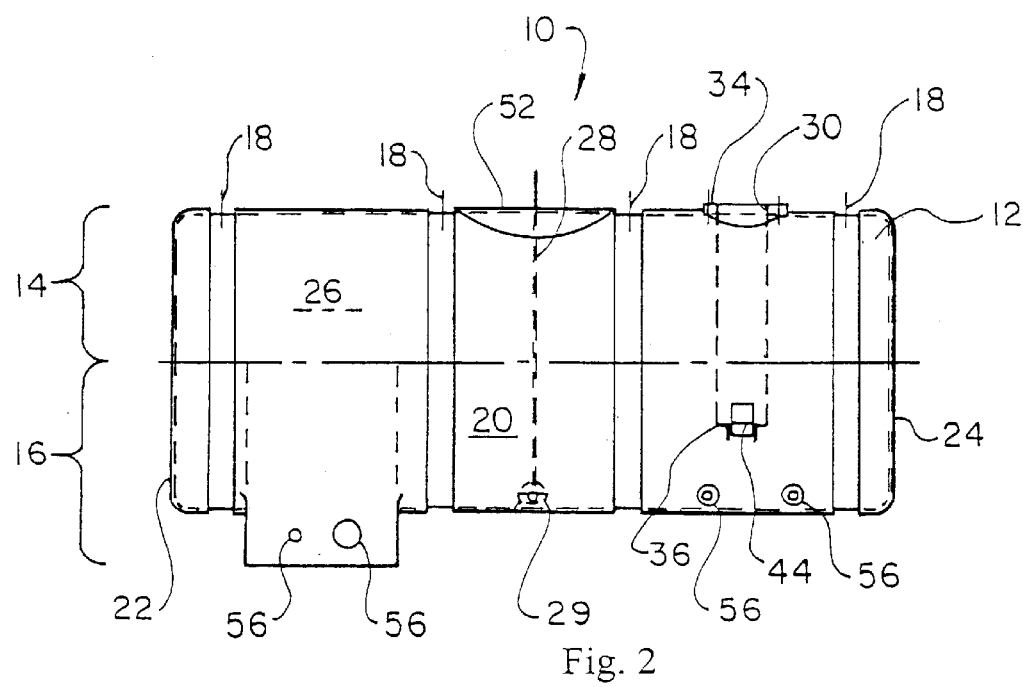
FIG. 2 is a rear side view of the hydraulic reservoir of the present invention shown in FIG. 1.
Figure 3:
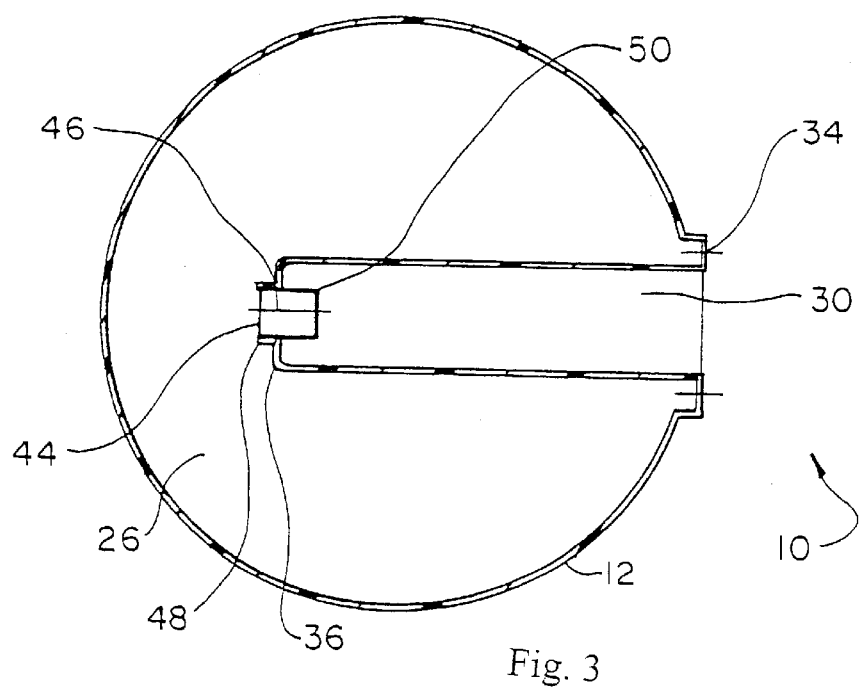
FIG. 3 is a sectional view of a return line of the hydraulic reservoir of FIGS. 1–2.
Figure 4:
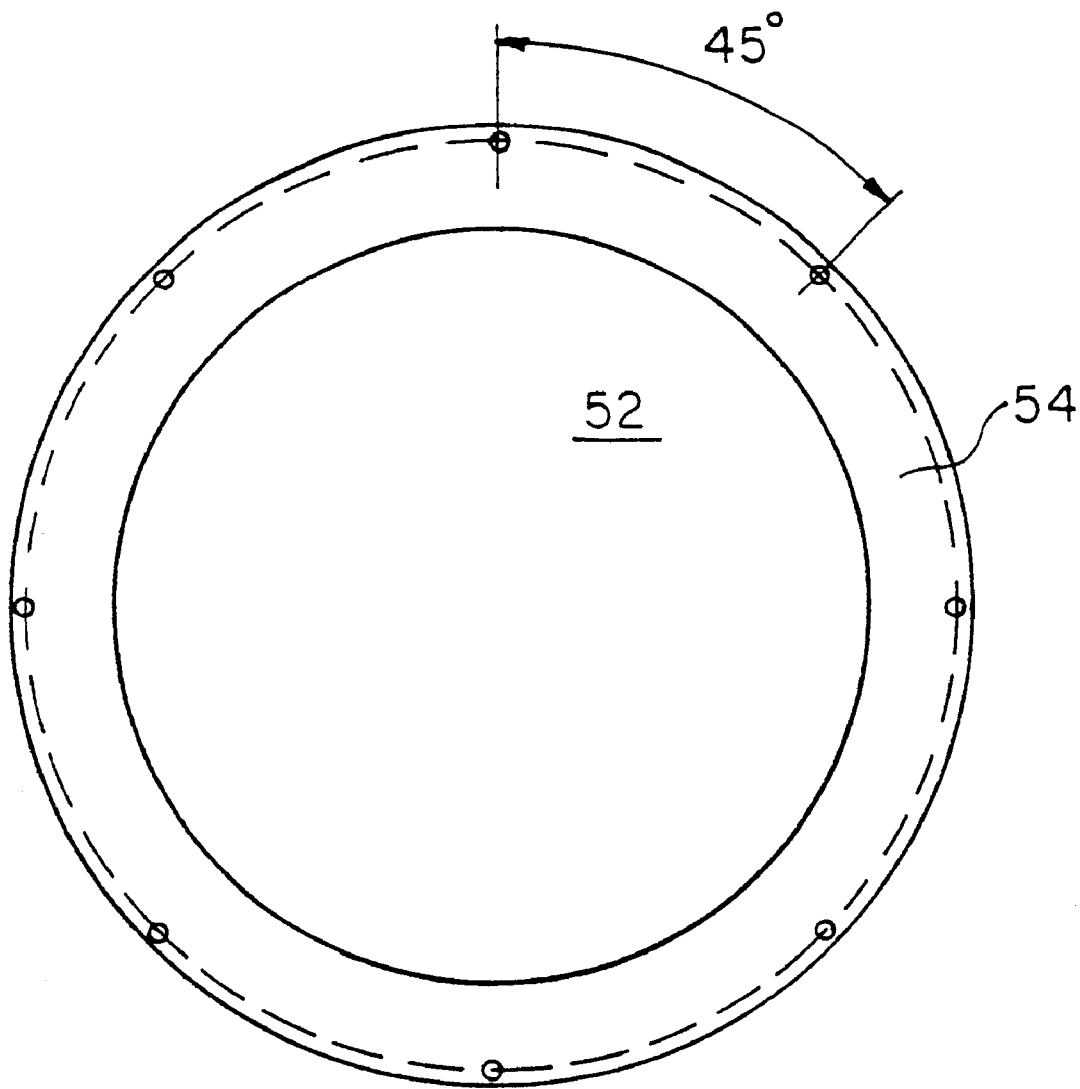
FIG. 4 is a top view of a filter cavity flange of the reservoir shown in FIGS. 1–3.
Figure 5:
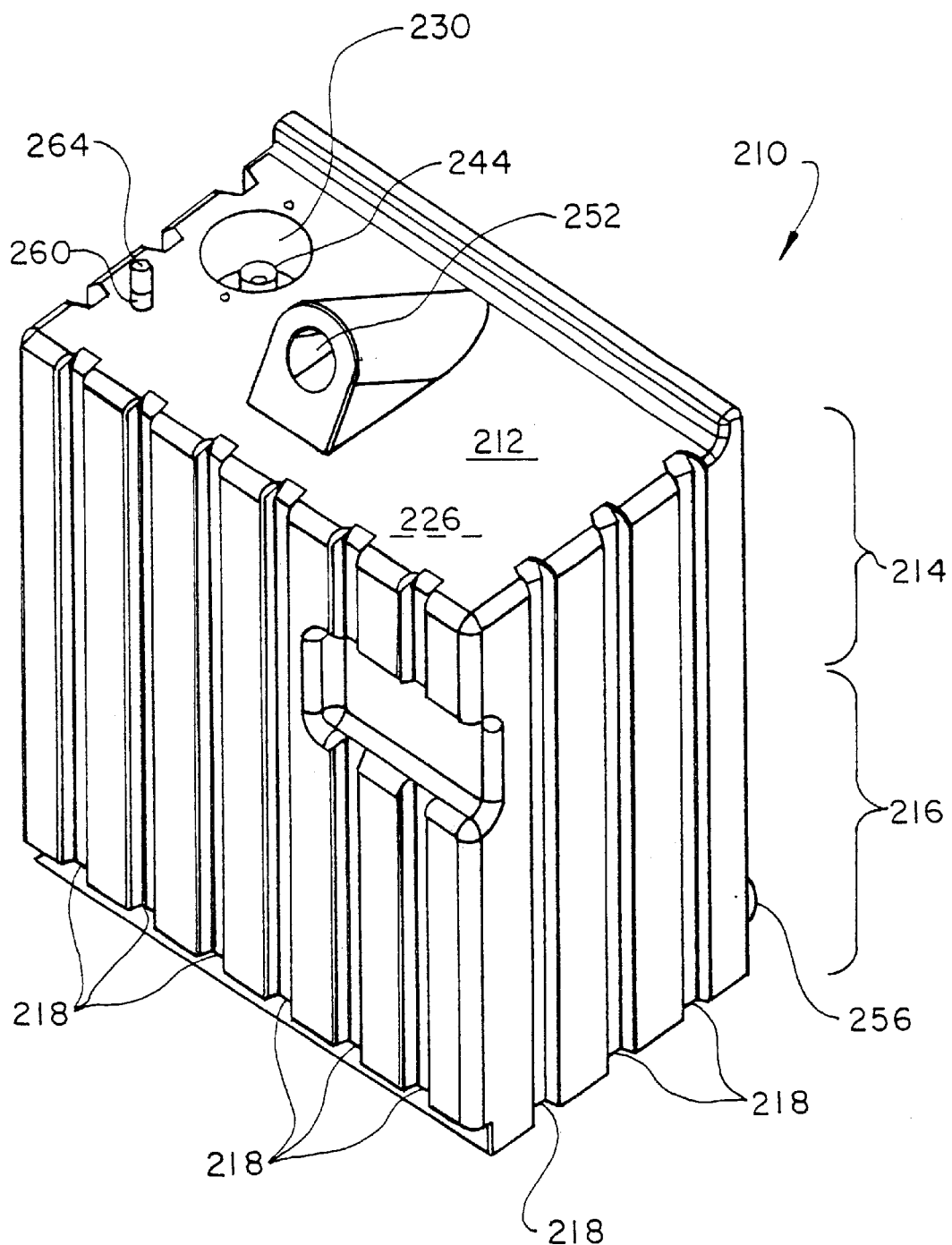
FIG. 5 is perspective view of a hydraulic reservoir according to a second embodiment of the present invention.
Figure 6:
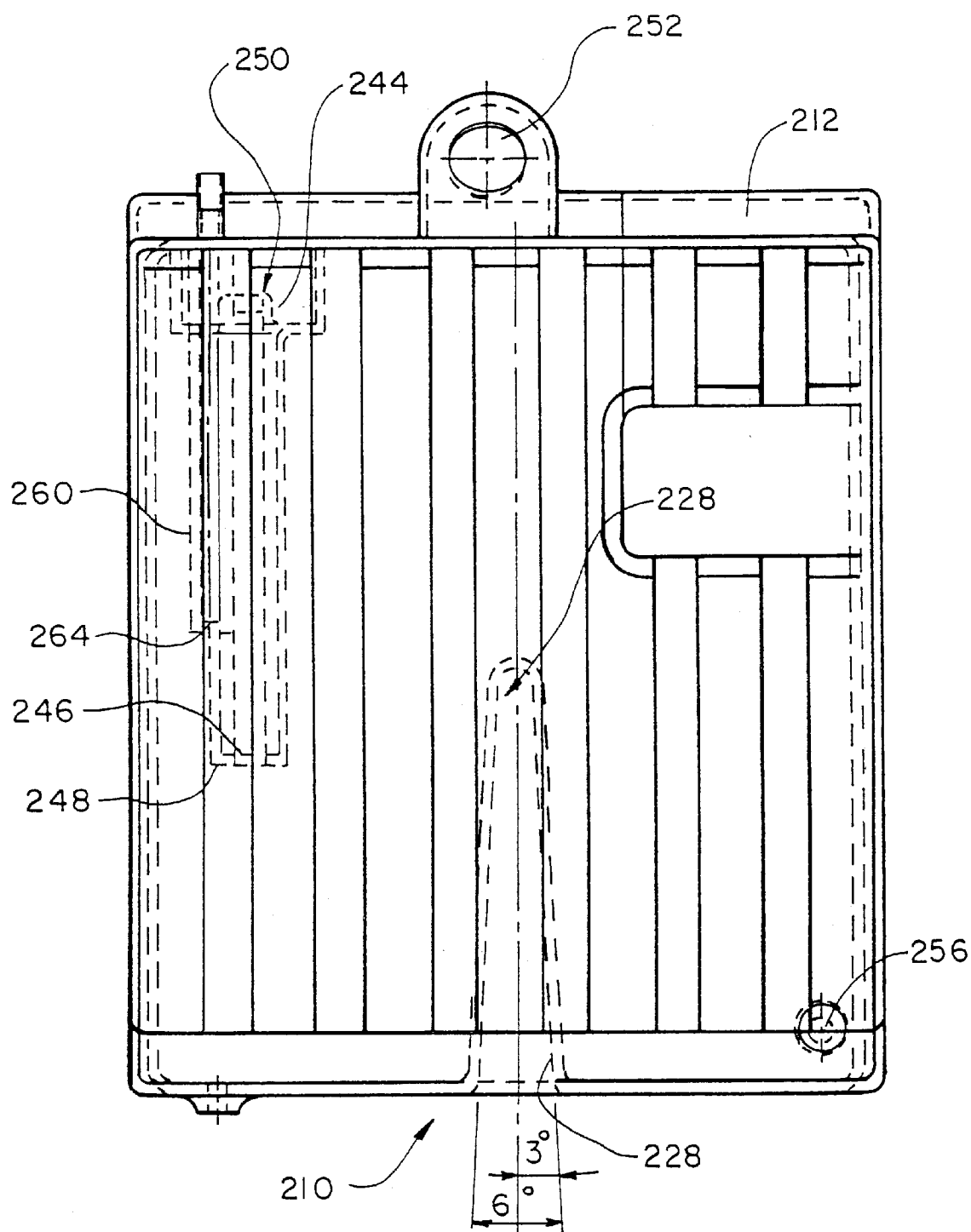
FIG. 6 is a side view of the hydraulic reservoir shown in FIG. 5.

One embodiment of the present invention is shown in FIGS. 1–4. As shown in FIGS. 1–4, the present invention includes a one-piece integral container or hydraulic reservoir 10 which may be formed as a generally cylindrically-shaped hydraulic reservoir 10. The term "hydraulic reservoir" within the meaning of this application refers to a container for holding working fluid that is conveyed and returned to the reservoir in a circulating system or a holding container for a fuel. Generally, the working fluid is for hydraulic power or for lubrication such as petroleum and water-based fluids.

Rotomolding allows for a variety of complex shapes to be easily molded such that the hydraulic reservoir 10 may be rectangular or other shapes dictated mainly by the intended use or environment of the hydraulic reservoir 10. Although the present invention is particularly designed for rotomolding, other molding techniques such as possibly blow molding may be used to form the hydraulic reservoir 10 of the present invention. The hydraulic reservoir 10 has a container body 12 having an upper portion 14, a lower portion 16, a plurality of annular depressions or ribs 18 extending around the hydraulic reservoir 10, an exterior surface 20, a first body side 22, and a second body side 24. The first portion 14 and the second portion 16 are delineated by an imaginary plane passing through a midpoint of the container body 12. The annular depressions or ribs 18 form reinforcing ridges for the hydraulic reservoir 10 which are particularly useful given the hydraulic reservoir 10 may have an expected operating temperature range of −20 F. to 180 F. The first portion 14, second portion 16, and sides 22, 24 of the hydraulic reservoir 10 form a container cavity 26.

The hydraulic reservoir 10 is preferably formed by rotomolding of a plastic resin resistant to chemical reactions with battery acid, hydraulic fluid, oil, transmission fluid, or UV light. Such plastic resins include but are not limited to treated polyethylenes, plastisols, nylon, fluoropolymers, polypropylene, polycarbonate, cellulose acetate, butyrate, elastomers, ionomer, polyurethane, EVA and other specially formulated compounds. The first and second portions 14, 16 and sides 22, 24 are approximately 0.25 inches thick, depending on the material selected and ability to withstand operating temperature range of generally −20 F. to 150 F. and up to 180 F. intermittent. The tensile strength is preferably per ASTMD638 of 2600 PSI and the impact strength should be good to about −20 F./−40 F. The fluid capacity of the hydraulic reservoir 10 is in excess of 150 gallons, however the hydraulic reservoir 10 may be sized to the desired operating conditions. These criteria result in the hydraulic reservoir 10 being well-suited for use as a hydraulic reservoir in the hydraulic system of heavy equipment, such as a mobile crane.

A removable baffle 28, made of metal or other appropriate material, may be inserted into the container cavity 26 through a manway access 52. The baffle 28 may be held in place, at least in part, by recesses or notches 29 formed in the lower portion 16. The baffle 28 is designed to control the movement of fluid and gases in the container cavity 26 and assures the mixing of oil within the container cavity 26 to assure temperature equalization of the fluid in operation. The baffle 29 may be changed or designed to fit the specific application of the hydraulic reservoir.

The first portion 14 of the container body 12 forms, in cross-section, a generally U-shaped filter cavity 30 which extends toward the second portion 16 of the container body 12. The filter cavity 30 has a first end 34 and a second end 36, with the second end 36 forming, in cross-section, a bowl shape which offers controlled shrinkage tolerances in the general vicinity of a metallic fluid element coupling insert 44 (discussed below). The first end 34 forms a connecting flange for a filter inlet coupling (not shown) to which one or more return lines may be coupled. The filter cavity 30 receives a conventional removable, replaceable filter element 38 connected to the insert 44 positioned adjacent the second end 36 of the filter cavity 30. The insert 44 is preferably a machined aluminum or brass bushing forming an insert cavity or bore 46, a first bushing end 48, and a second bushing end 50. The first bore 46 is preferably threaded for fastening to the inside of the mold during the rotomolding process. A conventional filter element 38 includes a connecting bore coupled to the outside diameter of the insert 44 through a sealing O-ring. The O-ring may be integral with the filter element 38 or provided as a separate element. If the O-ring is integral to the filter element 38, then the filter element 38 with the integral O-ring is pressed onto the insert 44. If the O-ring is a separate element, the O-ring is first positioned around the insert 44 or within the connecting bore of the filter around the insert 44 or within the connecting bore of the filter element 38 and then the filter element 38 is pressed into position. Any type of fluid tight connection between a conventional filter element 38 and the insert 44 is contemplated.

The metal insert 44 provides a more secure seal with the replaceable filter element 38 than having the seal be formed between the filter element 38 and the plastic forming the remainder of the hydraulic reservoir 10. The smooth outside of the insert 44 allows the use of a conventional replaceable filter element 38.

Figure 7:
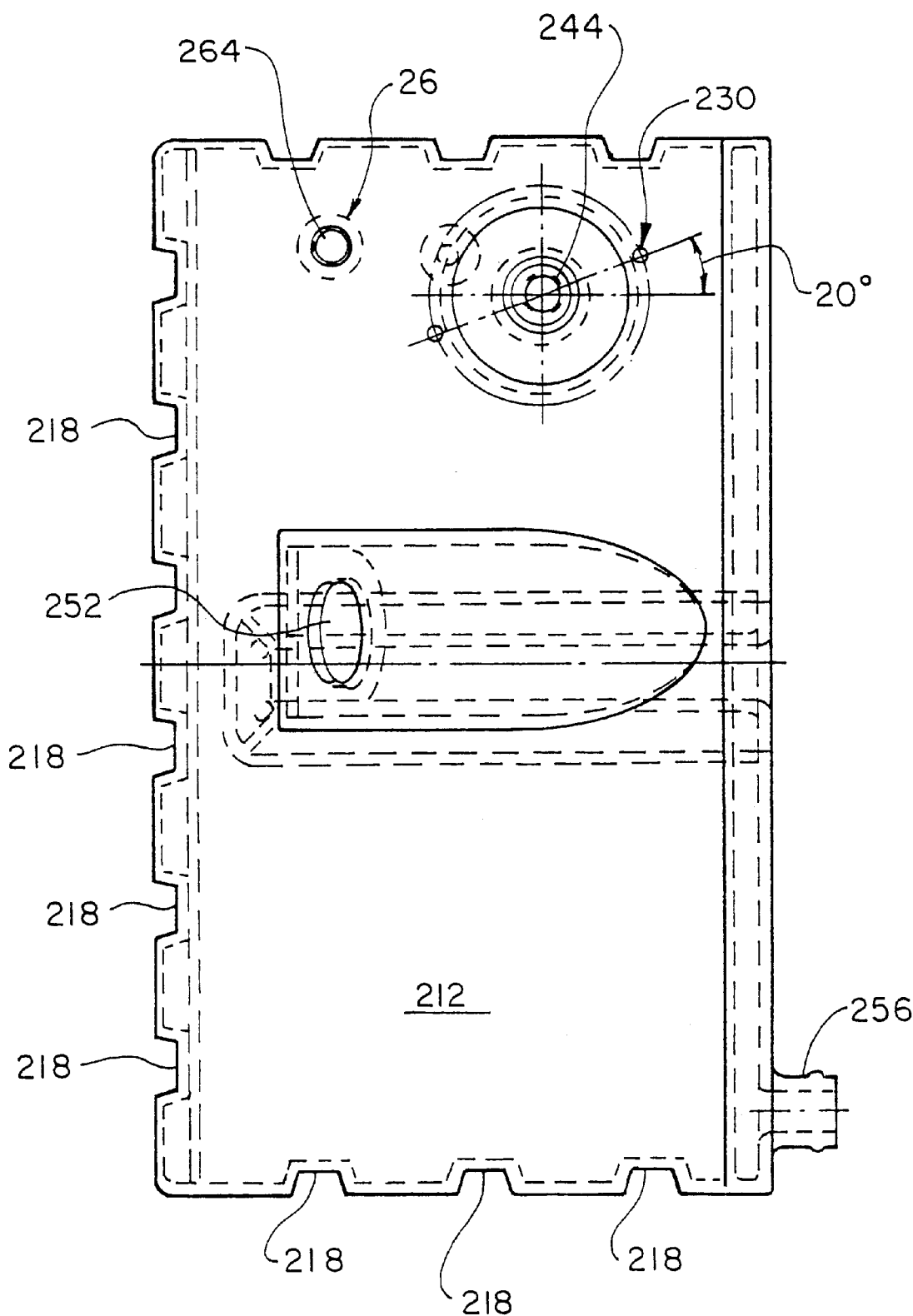
FIG. 7 is a top view of the hydraulic reservoir shown in FIG. 5.
Figure 8:
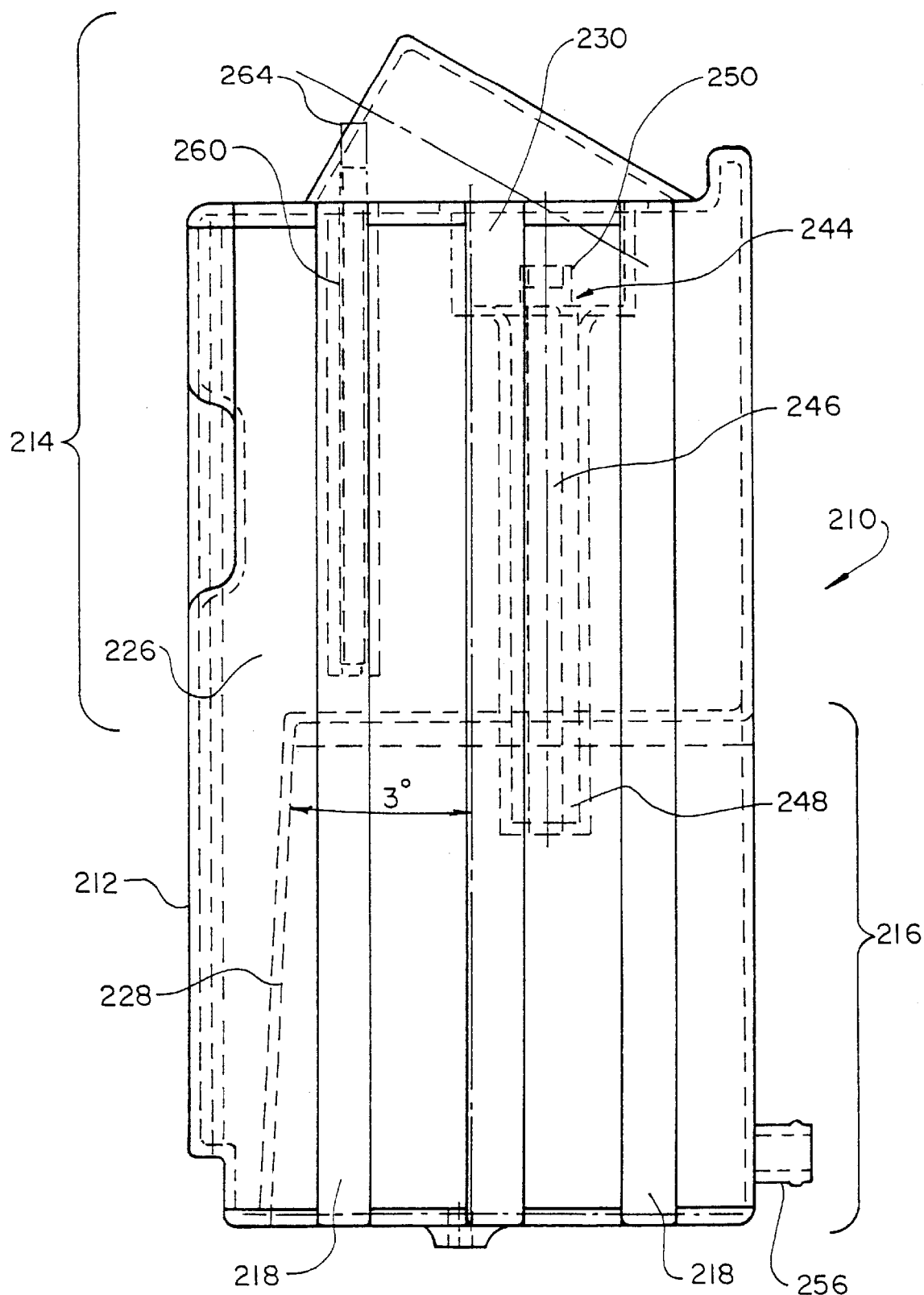
FIG. 8 is an end view of the hydraulic reservoir shown in FIG. 5.
Figure 9:
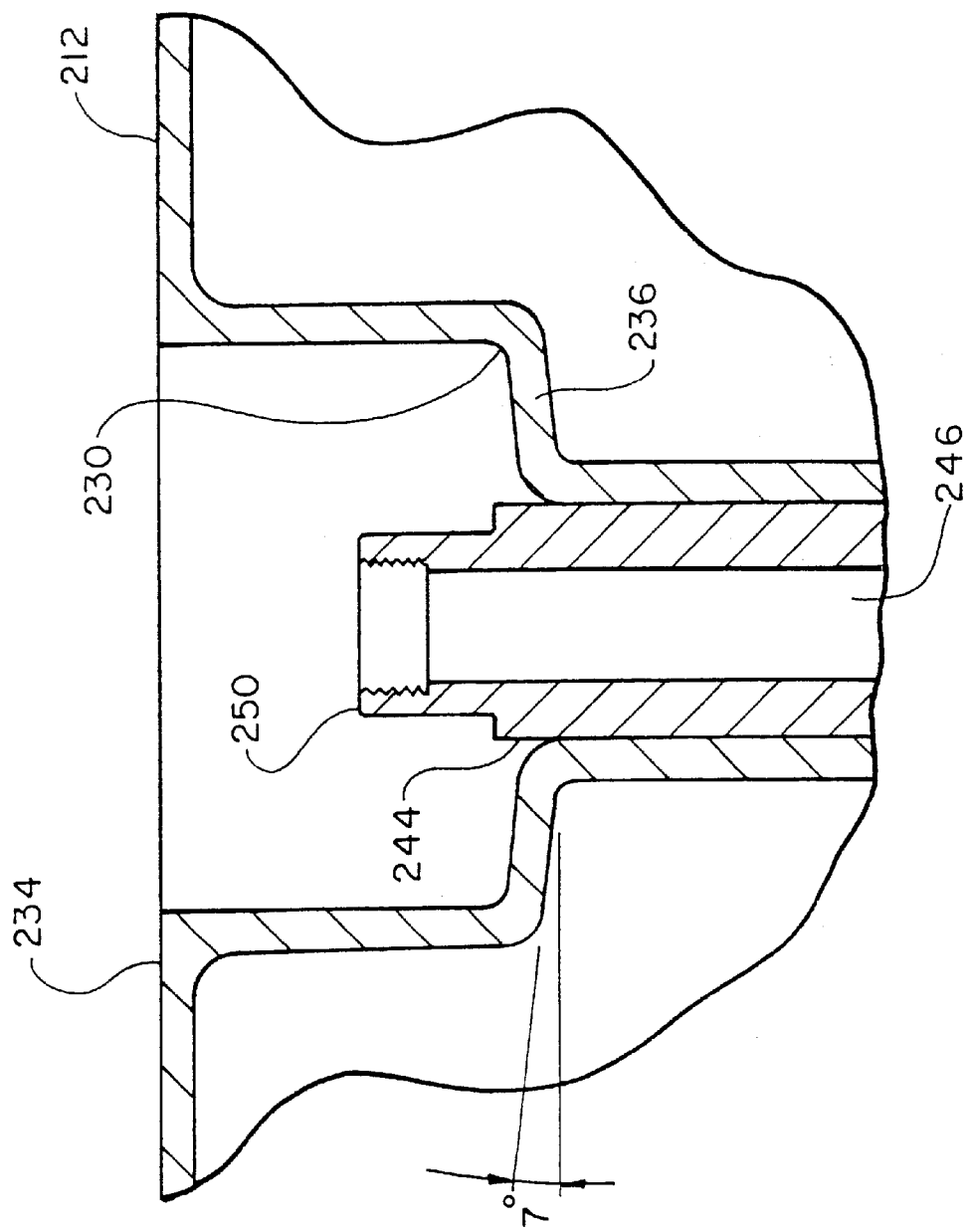
FIG. 9 is an enlarged sectional view of a filter element coupling insert of the hydraulic reservoir shown in FIG. 5.

The first portion 14 of the container body 12 also forms the manway access 52 for inserting the baffle 28 or easily filling the hydraulic reservoir 10 with a fluid, such as hydraulic fluid. The access 52, shown in FIG. 7, is preferably covered with a lid (not shown), preferably a fourteen gauge powder coated metal lid with provisions for an air breather (not shown) and shield (not shown). The lid attaches to the container body 12 via a band 54, which is also incorporated into the upper portion 14 of the container body 12.

Ports 56, such as 1.00 or 1.25 N.P.T. nozzles, are positioned adjacent the second portion 16 of the container body 12. An inside surface 60 of each port 56 is free from plastic resin material. The ports 56 can have a barb 62 for helping to secure a hose with room for a hose clamp. In operation, the ports 56 would supply one or more hydraulic users in the hydraulic system with the hydraulic fluid return being through the filter element 38 which removes debris, such as grit, metal filings, and the like from the hydraulic fluid. The formation of the hydraulic reservoir 10 with integral filter bowl effectively combines the reservoir and the filtering unit while allowing the use of standard replaceable filters. Further, the incorporation of the insert 44 provides an effective seal between the filter element 38 and the hydraulic reservoir 10.

FIGS. 5–9 show a container or hydraulic reservoir 210 according to the present invention which is also similar in construction to the hydraulic reservoir 10 described above. The hydraulic reservoir 210 is generally rectangular rather than cylindrical. The hydraulic reservoir 210 includes a container body 212 formed of an upper portion 214 and a lower portion 216 with ridges 218 formed on three sides of the hydraulic reservoir 210. The container body 212 forms a container cavity 226 for holding the hydraulic fluid.

The container 212 includes an integral baffle 228 formed by the lower portion 216. The baffle 228 is solid (i.e., no apertures along its surface) and extends almost one-half of the inside of the container cavity 226. The baffle 228, like inserted baffle 28, is designed to effect and control the fluid within the container body 212. The baffle 228 extends from one side substantially across the entire width of the container cavity 226. A gap is provided between the baffle 228 and the opposite side with the gap extending to the bottom surface of the container cavity 226. The baffle 228 will result in mixing of the fluid in the container cavity 226 while assuring that fluid at any level within the container cavity 226 can flow around the baffle 228. In modification of the invention, the gap may be on both sides of the baffle 228 or in the middle of the baffle 228 extending from both sides of the hydraulic reservoir 210. This design avoids the need for more than one drain plug and assures the fluid will not be prevented from reaching the outlet even with a minimum of hydraulic fluid in the container cavity 226.

The hydraulic reservoir 210 includes a filter cavity 230 having a first end 234 and a second end 236 as shown in FIGS. 5–9. The hydraulic reservoir 210 includes a fluid element coupling insert 244 similar to fluid element coupling insert 44 discussed above. The insert 244 includes an integral bore 246, a first end 248 and a second end 250. The insert 244 differs from insert 44 in that the first end 248 extends into the container cavity 226 a significant distance. The insert 244 will extend past the centerline into a position well below the normal fluid level line within the container cavity 226. This design will help avoid foaming within the fluid in the container cavity 226 and will generally improve the fluid flow characteristics within the container cavity 226. The insert 244 uses the same seal with the filter element 38 as the insert 44 described above.

The hydraulic reservoir 210 includes access 252 and ports 256 similar in operation to access 52 and ports 56 described above. Additionally, the hydraulic reservoir 210 is provided a second return line 260 extending into the container cavity 226 to a level below a normal fluid level in the container cavity 226 to about the mid-point of the container cavity. While no specific distance is disclosed for the amount that the second return line 260 extends into the container cavity 226, it is expected to be at least ⅓ of the container depth well below the ordinary normal fluid level within the hydraulic reservoir 210. The second return line 260 includes an integral metal coupling insert 264 for attachment of the second return. The second return line 260 is unfiltered (i.e., it does not have an integral filter, but an independent filter may be placed upstream). Consequently, the second return would be used with a light secondary system (i.e., a system not creating significant wear, grit or the like in the fluid). The second return line 260 also provides the fluid flow advantages offered by the insert 244 by the extended length into the container cavity 226 below the fluid level.

The invention has been described with reference to the preferred embodiment. Obvious modifications and alterations will occur to others upon reading and understanding the preceding detailed description. It is intended that the invention be construed as including all such modifications and alterations insofar as they come within the scope of the appended claims or the equivalents thereof.

We claim:

1. A hydraulic reservoir comprising:
   a rotomolded plastic container body;
   a container cavity formed by the rotomolded container body for holding hydraulic fluid, the hydraulic fluid defining a normal fluid level line within the container cavity;
   at least one rotomolded outlet in the container body; and
   at least one rotomolded return line integral with the rotomolded container body extending from an upper portion of the rotomolded container cavity above the normal fluid level in the rotomolded container cavity to a level below the normal fluid level in the container cavity.

2. The hydraulic reservoir as claimed in claim 1 wherein the return line extends at least to the mid-line of the container cavity.

3. The hydraulic reservoir as claimed in claim 1 wherein the return line is formed as a filter cavity formed by the container body and adapted to receive a removable filter element therein.

4. The hydraulic reservoir as claimed in claim 1 further including an insert molded in the container body adjacent the filter cavity, and wherein the insert is a metal insert having a smooth external surface which receives the removable filter element.

5. The hydraulic reservoir as claimed in claim 1 wherein the container body includes a plurality of outlet ports and at least two of the return ports.

6. The hydraulic reservoir as claimed in claim 1 wherein the container body forms an integral solid baffle within the container cavity extending from one side of the container body positioned between the return line and the outlet port.

7. The hydraulic reservoir as claimed in claim 6 wherein the baffle extends substantially across a lower portion of the container cavity with a gap between the other side of the container body and the baffle with the gap extending to a bottom surface of the container body.

8. The hydraulic reservoir as claimed in claim 6 wherein at least one return line is a filter cavity.

9. The hydraulic reservoir as claimed in claim 1 wherein the return line is formed as a filter cavity which extends from an upper portion of the container body into the container cavity and including an insert that extends to a position in the container cavity below the normal fluid level of the hydraulic reservoir.

10. The hydraulic reservoir as claimed in claim 1 wherein the return line is formed as a filter cavity which is extending from an upper portion of the container body and wherein the container body forms an integral solid baffle extending from one side of the container body.

11. The hydraulic reservoir as claimed in claim 10 further including a plurality of outlet ports at a lower portion of the container body.

12. The hydraulic reservoir as claimed in claim 11 wherein the reservoir further includes a second fluid return in the upper portion of the container body, the second return including an integral insert.

13. The hydraulic reservoir as claimed in claim 12 wherein the second fluid return extends at least ⅓ of the depth of the container cavity.

14. A hydraulic reservoir comprising:
    a plastic rotomolded container body;
    a container cavity formed by the rotomolded container body for holding hydraulic fluid;
    at least two rotomolded fluid return lines extending from an upper portion of the rotomolded container body to a depth below the normal fluid level in the container cavity; and
    at least one rotomolded outlet port positioned near a bottom of the rotomolded container body in fluid communication with the rotomolded container cavity.

15. A hydraulic reservoir comprising:
    a plastic container body;
    a container cavity formed by the container body for holding hydraulic fluid, the hydraulic fluid defining a normal fluid level line within the container cavity;
    a filter cavity formed by the container body and extending from an upper portion of the container body into the container cavity and in fluid communication with the container cavity, the filter cavity forming a return line for returning hydraulic fluid to the container cavity, wherein a fluid coupling between the filter cavity and the container cavity extends to a level below the normal fluid level line of the hydraulic reservoir; and at least one outlet port positioned near a bottom of the container body in fluid communication with the container cavity.

16. The hydraulic reservoir as claimed in claim 15 further including an insert molded in the container body adjacent the filter cavity wherein a removable filter element positioned within the filter cavity is coupled to the insert.

17. The hydraulic reservoir as claimed in claim 15 wherein the container body is rotomolded.

18. The hydraulic reservoir as claimed in claim 15 further including an integral baffle formed by the container body, wherein the baffle extends substantially across a lower portion of the container cavity with a gap between one side of the container body and the baffle with the gap extending to a bottom surface of the container body.

19. The hydraulic reservoir as claimed in claim 15 further including a second fluid return in the upper portion of the container body, the second return including an integral insert.

* * * * *